US008997077B1

(12) United States Patent
Connolly (10) Patent No.: US 8,997,077 B1
(45) Date of Patent: Mar. 31, 2015

(54) SYSTEMS AND METHODS FOR REMEDIATING A DEFECTIVE UNINSTALLER DURING AN UPGRADE PROCEDURE OF A PRODUCT

(75) Inventor: Stephen Connolly, High Wycombe (GB)

(73) Assignee: Symantec Corporation, Mountain View, CA (US)

( * ) Notice: Subject to any disclaimer, the term of this patent is extended or adjusted under 35 U.S.C. 154(b) by 1204 days.

(21) Appl. No.: 12/557,646

(22) Filed: Sep. 11, 2009

(51) Int. Cl.
G06F 9/44 (2006.01)
G06F 17/30 (2006.01)

(52) U.S. Cl.
CPC .................. *G06F 17/30345* (2013.01)
USPC ........... 717/168; 717/174; 717/175; 717/176; 717/177; 717/178

(58) Field of Classification Search
None
See application file for complete search history.

(56) References Cited

U.S. PATENT DOCUMENTS

| 6,598,224 | B1* | 7/2003 | Maeda et al. ............ 717/174 |
| 7,263,518 | B2* | 8/2007 | Ledingham et al. ........... 1/1 |
| 7,437,441 | B1* | 10/2008 | Drew et al. ............ 709/223 |
| 7,587,715 | B1* | 9/2009 | Barrett et al. ............ 717/176 |
| 7,882,438 | B2* | 2/2011 | Markham et al. ........ 715/736 |
| 7,937,496 | B2* | 5/2011 | Kegoya et al. .......... 709/246 |
| 2002/0019844 | A1* | 2/2002 | Kurowski et al. ........ 709/201 |
| 2002/0019972 | A1* | 2/2002 | Grier et al. ............ 717/3 |
| 2002/0128856 | A1* | 9/2002 | Stefik et al. ............ 705/1 |
| 2002/0198976 | A1* | 12/2002 | Davenport .............. 709/223 |
| 2003/0135476 | A1* | 7/2003 | Holland et al. .......... 706/47 |
| 2003/0191823 | A1* | 10/2003 | Bansal et al. ........... 709/220 |
| 2003/0208593 | A1* | 11/2003 | Bharati et al. .......... 709/224 |
| 2004/0003266 | A1* | 1/2004 | Moshir et al. .......... 713/191 |
| 2004/0098359 | A1* | 5/2004 | Bayliss et al. ............ 707/1 |
| 2005/0027846 | A1* | 2/2005 | Wolfe et al. ........... 709/223 |
| 2005/0246415 | A1* | 11/2005 | Belfiore et al. ......... 709/203 |
| 2006/0174243 | A1* | 8/2006 | Brewer et al. .......... 717/174 |
| 2006/0179121 | A1* | 8/2006 | Kegoya et al. .......... 709/217 |
| 2006/0282456 | A1* | 12/2006 | Kapoor et al. .......... 707/102 |
| 2006/0288034 | A1* | 12/2006 | Do et al. ............... 707/102 |
| 2007/0150886 | A1* | 6/2007 | Shapiro ................ 717/174 |
| 2007/0180509 | A1* | 8/2007 | Swartz et al. ............ 726/9 |
| 2007/0230486 | A1* | 10/2007 | Zafirov ................ 370/401 |
| 2007/0282852 | A1* | 12/2007 | Lakshminarayanan et al. ................. 707/10 |
| 2008/0052275 | A1* | 2/2008 | Kantak et al. ............ 707/3 |
| 2008/0066151 | A1* | 3/2008 | Thomsen et al. .......... 726/1 |
| 2008/0134347 | A1* | 6/2008 | Goyal et al. ............ 726/29 |
| 2009/0077664 | A1* | 3/2009 | Hsu et al. ............. 726/24 |

(Continued)

OTHER PUBLICATIONS

Website: http://community.installshield.com/archive/index.php?t-137885.html, *How to Updated/Modify and Cached MSI File From a Custom Action?*, Nov. 9, 2009 (1 pg.).

(Continued)

*Primary Examiner* — Henry Tsai
*Assistant Examiner* — Christopher Bartels
(74) *Attorney, Agent, or Firm* — Holland & Hart, LLP (57) ABSTRACT

A computer-implemented method for remediating a defective uninstaller during an upgrade of a product is described. A system is queried to identify the defective uninstaller. An executable application is streamed to a file in a temporary folder. The executable application is separate from the defective uninstaller. An internal database table is queried to generate a script file containing commands used to modify the defective uninstaller. The script file is executed with the executable application to modify the defective uninstaller.

18 Claims, 7 Drawing Sheets

(56) References Cited

U.S. PATENT DOCUMENTS

2009/0300164 A1* 12/2009 Boggs et al. .................. 709/224
2010/0083285 A1* 4/2010 Bahat et al. ................... 719/328
2010/0095348 A1* 4/2010 Foster et al. ....................... 726/1

OTHER PUBLICATIONS

Website: http://www.symantec.com/connect/forums/creating-new-shortcut-icons-modify-or-repair-mode, *Creating New Shortcut Icons in Modify or Repair Mode*, Nov. 9, 2009 (3 pgs.).

Website: http://www.symantec.com/connect/forums/error-2717-editing-cached-msi, *Error 2717 Editing Cached MSI*, Nov. 9, 2009 (8 pgs.).

Website: http://www.symantec.com/connect/forums/upgrade-problem-and-removeexistingproducts, *Upgrade Problem and RemoveExistingProducts*, Nov. 9, 2009 (3 pgs.).

Website: http://www.symantec.com/connect/forums/removeexistingproducts-location, *RemoveExistingProducts Location*, Nov. 9, 2009 (3 pgs.).

Website: http://msdn.microsoft.com/en-us/library/aa371197(VS.95).aspx, *RemoveExistingProducts Action*, Nov. 9, 2009 (2 pgs.).

* cited by examiner

SYSTEMS AND METHODS FOR REMEDIATING A DEFECTIVE UNINSTALLER DURING AN UPGRADE PROCEDURE OF A PRODUCT

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Computer technologies used by consumers and by the business world continue to demand that the efficiency of these technologies increase. These demands have included demands to improve products and software implemented on computer systems. For example, new versions of software may be downloaded on a computer system to replace the previous version of the software.

Removing or replacing previous versions of products and/or software may cause errors to occur within the computer system. For example, files or other resources that are common to both the upgraded version of the product and the prior version of the product may be deleted from the computer system when the previous version of the product is removed. This may cause errors and other malfunctions to occur when the computer system implements the upgraded version of the product. As a result, benefits may be realized by providing improved systems and methods for remediating a defective uninstaller during an upgrade procedure of a product on a computer system.

SUMMARY

According to at least one embodiment, a computer-implemented method for remediating a defective uninstaller during an upgrade of a product is described. A system is queried using a custom action within a first installer package to identify one or more defective uninstallers. An executable application is streamed to a file in a temporary folder. The executable application is separate from the one or more defective uninstallers. Database tables are queried in the first installation package to create a script file to modify the one or more defective uninstallers. The script file is executed with the executable application to modify the one or more defective uninstallers.

In one embodiment, the location of the streamed executable application, the location of the one or more defective uninstallers, and the location of the script file may be stored. The locations may be stored in a CustomActionData property. In one configuration, the defective uninstaller may be cached. The script file may be a structured query language (SQL) script file.

In one configuration, an installation procedure for an upgrade to the product may be initiated within the first installer package. The database table may include an identifier field, an SQL field, and a condition field. In one example, the SQL field may include an SQL statement to execute on the defective uninstaller. The condition field may include a statement to indicate whether the SQL statement is to be executed on the one or more defective uninstallers. In one embodiment, a SetupPatchScript immediate custom action may be executed to stream the executable application to the file in the temporary folder.

A computer system configured to remediate a defective uninstaller during an upgrade of a product is also described. The computer system may include a processor and memory in electronic communication with the processor. The computer system may also include an installer service that includes a first installer package and one or more defective uninstallers. The service is configured to identify the one or more defective uninstallers, and stream an executable application to a file in a temporary folder. The executable application is separate from the one or more defective uninstallers. The service may be further configured to query database tables in the first installer package to create a script file to modify the one or more defective uninstallers, and execute the script file with the executable application to modify the one or more defective uninstallers.

A computer-program product for remediating a defective uninstaller during an upgrade of a product is also described. The computer-program product may include a computer-readable medium having instructions thereon. The instructions may include code programmed to query a system to identify one or more defective uninstallers, and code programmed to stream an executable application to a file in a temporary folder. The executable application is separate from the one or more defective uninstallers. The instructions may further include code programmed to create a script file to modify the one or more defective uninstallers, and code programmed to execute the script file with the executable application to modify the one or more defective uninstallers.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Computing devices may implement installers to install software and products on the device. In one embodiment, these installers may also initiate an uninstall action to uninstall software or products previously installed on the device. During an uninstall action, certain operations may be performed. For example, the uninstall actions may include forcing the device to reboot. In addition, the actions may accidentally remove files and other resources from the computing device in order to remove traces of the previously installed software application or product.

One example of an installer may be a Windows® installer. In one embodiment, the installation of a new version of a software application may be referred to as an upgrade. During the upgrade, a new version of the application may be installed on top of the old version. The installer may invoke uninstall actions in order to attempt to uninstall the previous version of the application. One example of an uninstall action that may be used is a RemoveExistingProducts action. If, however, the design of the uninstallation actions is flawed, this process may inadvertently destroy resources that need to be preserved across the upgrade. These resources may include files, services, registry entries, or even entire databases. The elimination of these resources may leave the computing device in an undesirable state.

Currently, faulty uninstallation designs may arise from a failure to synchronize the Globally Unique Identifiers (GUIDs) of an application (or product) between different versions of the application. In addition, the omission of the command 'and not UpGradingProductCode' in the scheduling conditions of some custom actions designed to run during installation may also cause failures during the uninstall process.

In one example, an uninstaller may be cached locally on a system and may be modified. The uninstaller, however, may not be directly manipulated by an installer service during the execution of an upgrade. In one configuration, a mutex exists within the installer service that prevents the service from opening more than one package (such as a Microsoft® installer (MSI) package) at a time during the main installation transaction (i.e., upgrade). Currently, a user may modify the existing installation services before the product is uninstalled during the upgrade. For example, the user may apply an installer patch or otherwise modify a cached MSI package that may be used to uninstall the old product. Patching may be an expensive operation as it may effectively trigger a repair operation, which may take a significant length of time for a large software product. Modifying the cached package directly, like patching, may require additional logic to be included in a mechanism used to deliver the upgrade (i.e., a bootstrapper application).

During an upgrade of an application, an installer may run an uninstaller associated with the old version of the application in order to remove any redundant resources. The previous version of the application may include defects that may be manifested during the uninstallation process. These defects may not be fixed unless the user applies a patch to the product (or application) that is to be upgraded. The present systems and methods describe a mechanism to allow the uninstallation process of the old version of an application to be dynamically modified as part of the upgrade. This may allow the uninstallation process to proceed smoothly inside the upgrade process. The present systems and methods may be implemented internally to an MSI package without relying on external bootstrapper applications or pre-requisite patches. The present systems and methods may by-pass an installer's mutex that prevents the installer service from opening more than one installer package inside the installer transaction.

Figure 1:
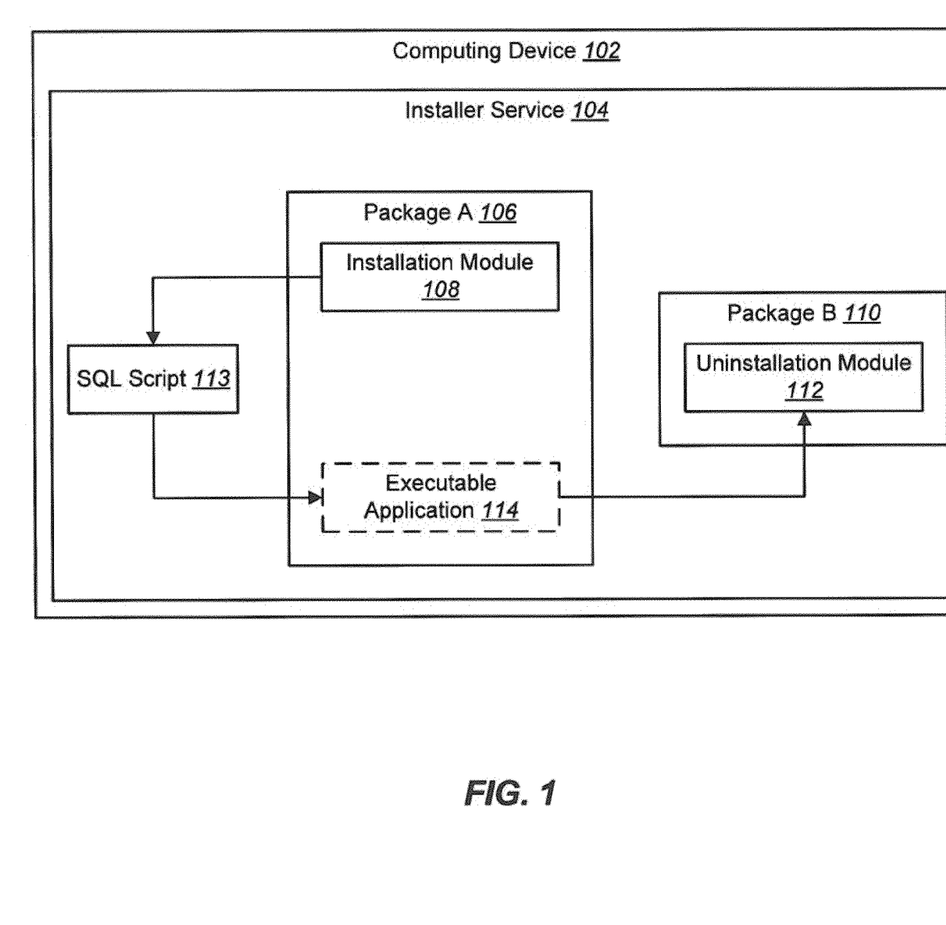
FIG. 1 is a block diagram illustrating one embodiment of a computing device that may implement the present systems and methods.

FIG. 1 is a block diagram illustrating one embodiment of a computing device 102 that may implement the present systems and methods. The computing device 102 may be a personal computer (PC), a laptop, a server, a personal digital assistant (PDA), and the like. In one embodiment, the computing device 102 may include an installer service 104. An example of the installer service 104 may be a Windows® installer service.

In one configuration, the installer service 104 may be an engine for the installation, maintenance, and removal of software or products on the computing device 102. Installation information, and often the files themselves, may be packaged in packages. For example, the installer service 104 may manage package A 106 and package B 110. In one example, package A 106 may include an installation module 108 and package B 110 may include an uninstallation module 112. The installation module 108 may be responsible for installing and maintaining software installed on the computing device 102. Package B 110 may include an uninstallation module 112 and may be cached locally on a computing device 102. In one embodiment, the uninstallation module 112 may be responsible for the removal of software or other products installed on the computing device 102. For example, the installation module 108 may implement certain actions to install a new version of an application on the device 102. The installation module 108 may also instruct the uninstallation module 112 to uninstall the previous version of the application from the device 102.

In one embodiment, the computing device 102 may further include an executable application 114. The executable application 114 may be a separate and distinct process from the installer service 104. In one example, the executable application 114 may be delivered inside package A 106 and the application 114 may temporarily reside on the computing device 102. In other words, the executable application 114 may not be persistently stored on the computing device 102.

In one configuration, the executable application 114 may receive instructions or information from the installation module 108. The application 114 may modify or edit certain parameters of the uninstallation module 112 based on the data received from the installation module 108. For example, the installation module 108 may provide instructions to the executable application 114 to repair certain defects or errors in the uninstallation module 112. These instructions may be provided to the application 114 in the form of a structured query language (SQL) script 113. The script 113 may be written by the installation module 108. The SQL script 113 may be created dynamically by the installation module 108 and the script 113 may not be delivered as part of package A 106.

Figure 2:
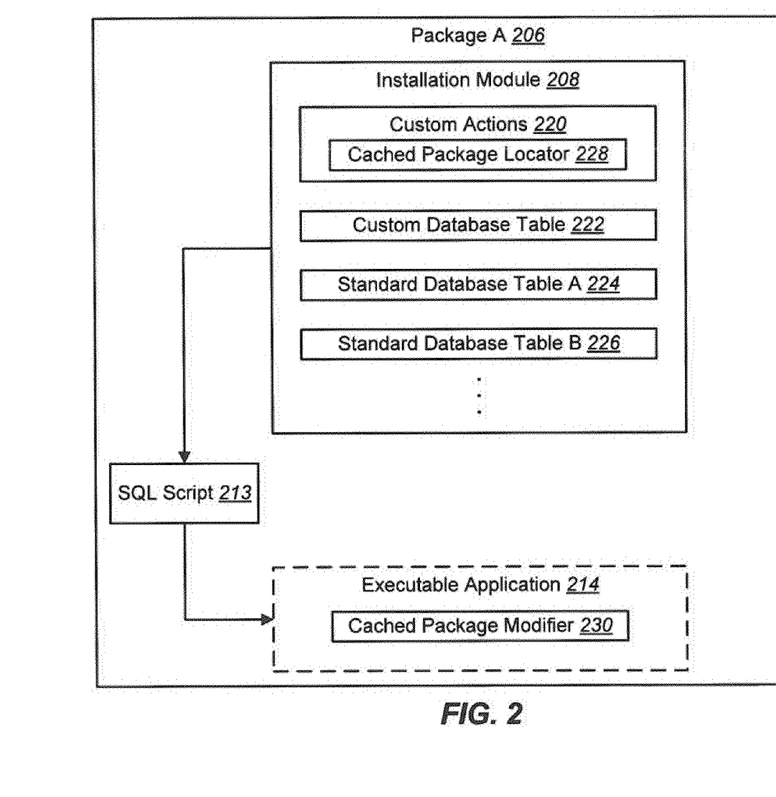
FIG. 2 is a block diagram illustrating an embodiment of an installer package.

FIG. 2 is a block diagram illustrating one embodiment of a package associated with an installer service, such as package A 206. In one configuration, package A 206 may include an installation module 208 that may be managed by the installer service 104 (not shown). The installation module 208 may include custom actions 220. The custom actions 220 may be delivered as a dynamically-linked library (DLL). In one embodiment, the custom actions 220 may be executed by the installation module 208 during an installation sequence. In one embodiment, the custom actions 220 may validate product license keys, or initialize more complex services. The custom actions 220 may include a cached package locator 228. The locator 228 may locate one or more cached packages stored on the computing device 102. The installation module 208 may also include one or more standard database tables 224, 226. In a further embodiment, the installation module 208 may include a custom database table 222. Details regarding the custom database table 222 will be provided below.

In one configuration, package A 206 may communicate with an executable application 214 via the installation module 208. Instructions may be communicated from package A 206 to the executable application 214 regarding modifications to apply to a package that has been previously cached on the computing device 102, such as package B 110. This information may be provided in the form of a SQL script 213 written by one of the custom actions 220. A cached package may include an uninstallation module 112 that may be responsible for uninstalling or removing files, parameters, etc. associated with a previous version of an application or product.

In one embodiment, the executable application 214 may be part of package A 206. For example, the application 214 may be stored in a binary table (not shown) of package A 206. During execution of the installer service 104, the application 214 may be streamed to a temporary location. In addition, the executable application 214 may include a cached package modifier 230. The modifier 230 may process the information received from package A 206 and modify the one or more cached packages on the computing device 102 in accordance with the instructions received from package A 206 through the SQL script 113.

Figure 3:
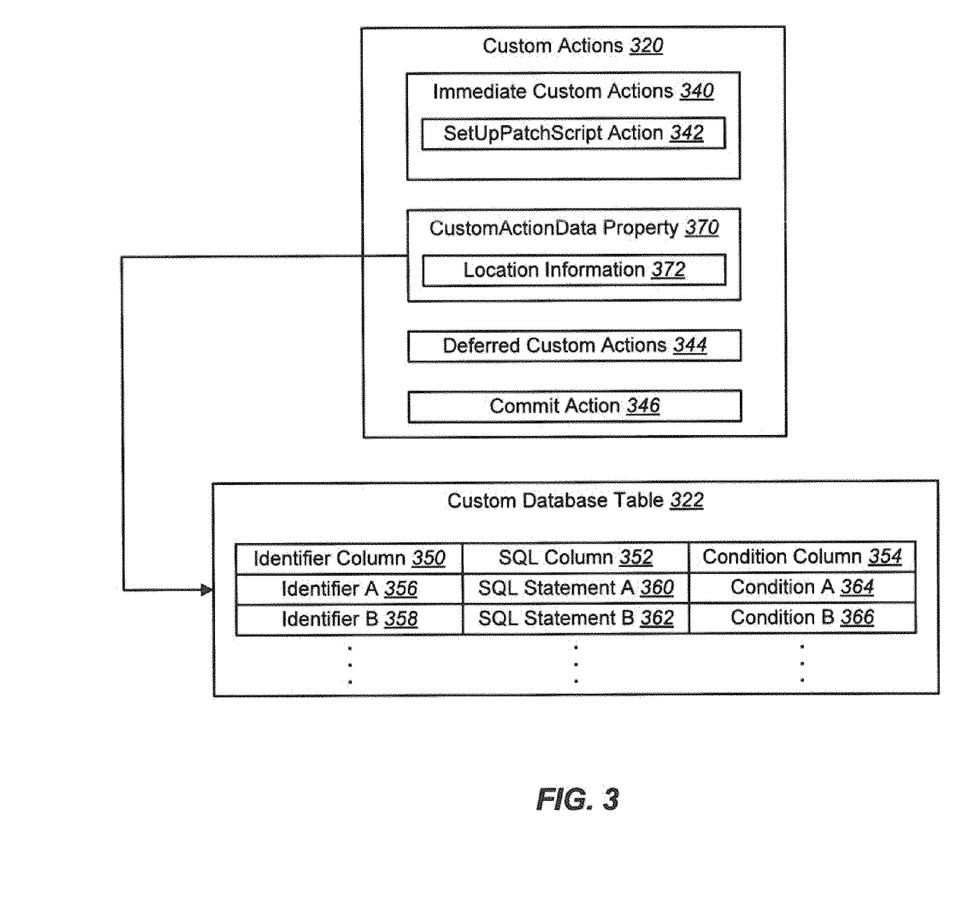
FIG. 3 is a block diagram illustrating an embodiment of custom actions that may be executed or implemented by an installation module.

FIG. 3 is a block diagram illustrating a further embodiment of custom actions 320 that may be executed or implemented by an installation module 208. In one embodiment, the custom actions 320 may include immediate custom actions 340. Immediate custom actions 340 may provide instructions to install or uninstall features of a product, software, etc. For example, the immediate custom actions 340 may include additional instructions to modify the behavior of the installer service 104. Immediate custom actions 340 may cause the execution of a sequence of actions. In addition, an installation database may be queried to build an internal script describing the execution of the sequence of actions in detail. An example of an immediate custom actions 340 may include a SetupPatchScript action 342. In one embodiment, the SetupPatchScript action 342 may include the cached package locator 228 to locate any cached installer packages on the computing device 102. The action 342 may also query a custom database table 322 to identify changes to be applied to a located package. The action 342 may also store a script and package locations in the relevant CustomActionData properties 370 for use by a deferred custom action 344 and a commit action 346.

The custom actions 320 may also include deferred custom actions 344. In one embodiment, deferred custom actions 344 may invoke the executable application 214 to execute the commands in the SQL script 213 built by the immediate custom actions 340 in the context of an installer service 104. In addition, the custom actions 320 may include a commit action 346 which may perform certain clean-up procedures required after the execution of the immediate custom actions 340 and the deferred custom actions 344.

In a further embodiment, the custom actions 320 may include a CustomActionData property 370. The CustomActionData property 370 may store location information 372. In one configuration, the location information 372 may indicate the location of an executable application 114, cached packages (such as package B 110), and scripts that define the SQL commands to be executed on the cached packages.

In one example, the custom actions 320 may query a custom database table 322. The custom database table 322 may be part of the installation module 208 as previously described. In one embodiment, the custom database table 322 may include various columns 350, 352, 354. For example, the custom database table 322 may include an identifier column 350, a structured query language (SQL) column 352, and a condition column 354. As illustrated, the identifier column 350 may include identifier A 356 and identifier B 358. The identifier column 350 may include more or less than two identifiers 356, 358. The identifiers 356, 358 may identify a particular record stored within the custom database table 322.

In one embodiment, the SQL column 352 may include various SQL statements 360, 362. An SQL statement 360, 362 may describe a statement or an action that is to be executed against a cached package. The condition column 354 may include conditions 364, 366 that are either empty or evaluated as a true condition if a corresponding SQL statement is to be executed. For example, the SQL statement A 360 may be associated with condition A 364. If the condition A 364 is empty or evaluated as a true condition, the SQL statement A 360 may then be written to an SQL script so that it may be executed on a particular cached package. The SQL statement A 360 and the associated condition A 364 may be identified by the identifier A 356.

Figure 4:
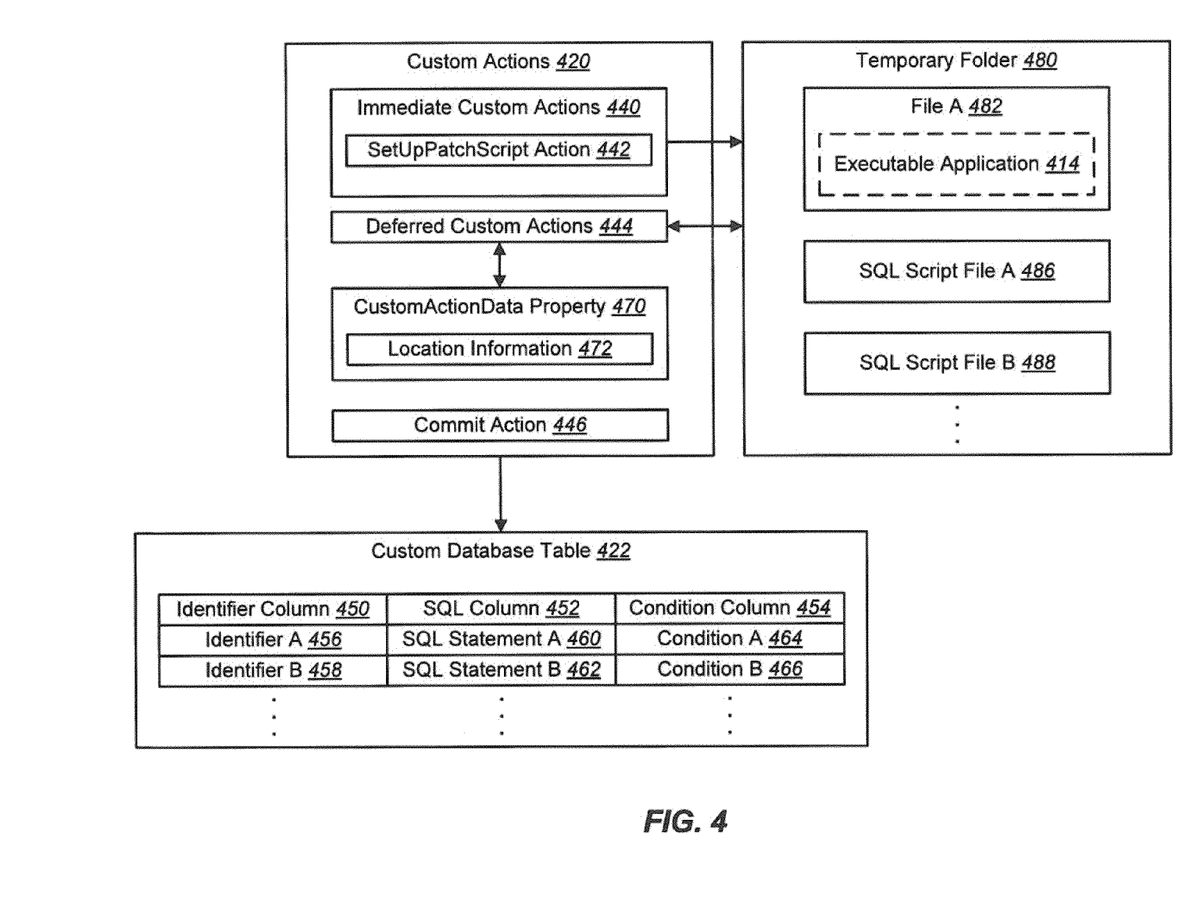
FIG. 4 is a block diagram illustrating a further embodiment of custom actions querying a custom database table.

FIG. 4 is a block diagram illustrating a further embodiment of custom actions 420 querying a custom database table 422. As previously explained, the custom actions 420 may include immediate custom actions 440, deferred custom actions 444, CustomActionData property 470, and a commit action 446. In one embodiment, the immediate custom action, SetupPatchScript action 442, may stream an executable application 414 to a file 482 in a temporary folder 480. The SetupPatchScript action 442 may also query the custom database table 422, and for each cached package to be modified, the action 442 may create a script file 486, 488 in temporary folder 480. For example, SQL script file A 486 may be created to modify a first cached package and SQL script file B 488 may be created to modify a second cached package. In one embodiment, the location of the executable application 414, the location of each of the cached packages, and the location of the corresponding SQL script 486, 488 may be stored in the CustomActionData property 470 as location information 472.

In one configuration, the deferred custom action 444 may read in the data stored in the CustomActionData property 470 and invoke the executable application 414. The deferred custom action 444 may also pass the location of the cached package to be modified, as well as the location of the corresponding SQL script, to the executable application 414. In one example, the commit action 446 may be implemented to clean-up any temporary files created by the actions implemented by the immediate custom actions 440 and the deferred custom action 444 described above.

Figure 5:
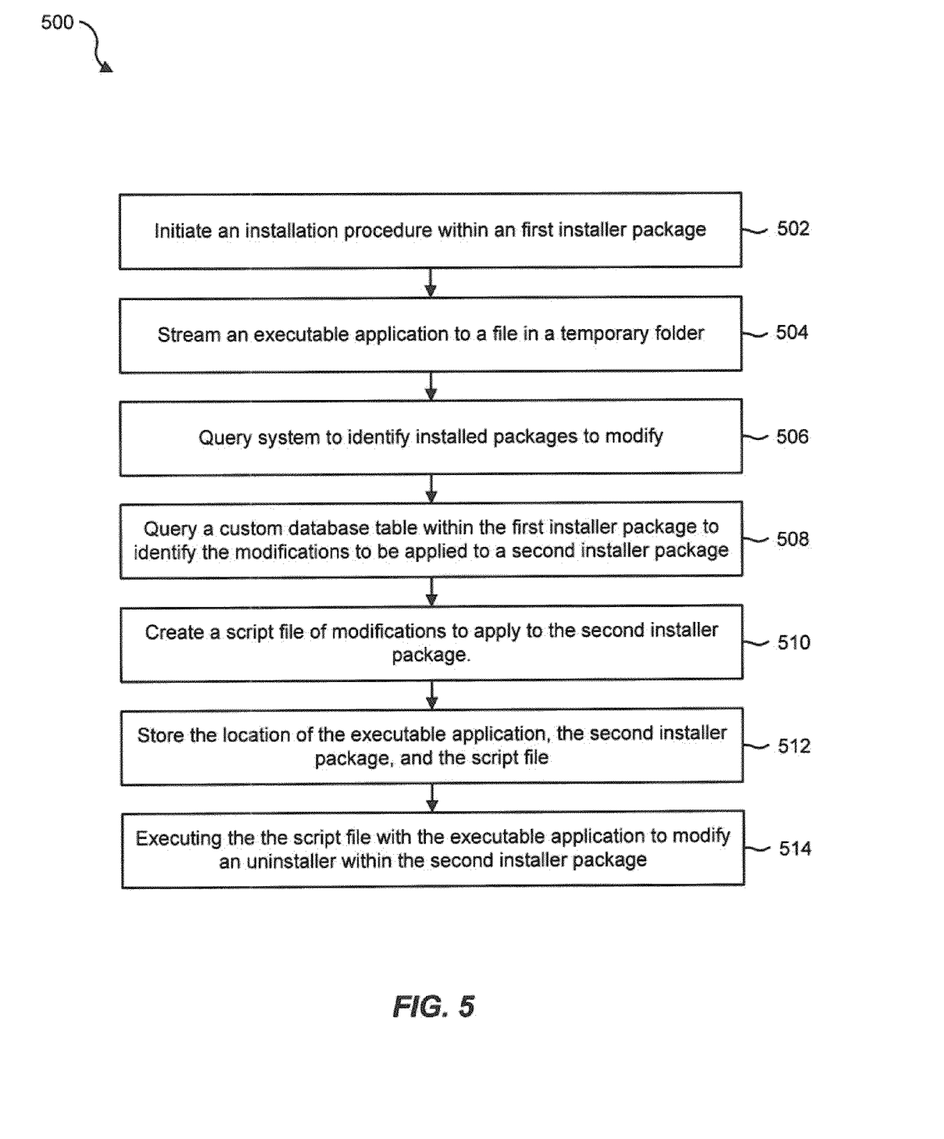
FIG. 5 is a flow diagram illustrating one embodiment of a method for remediating a defective uninstaller during the upgrade procedure of a product.

FIG. 5 is a flow diagram illustrating one embodiment of a method for remediating defective installers in order to permit a seamless upgrade of a product (or software). In one configuration, the method 500 may be implemented by an installer service 104.

In one example, an installation procedure may be initiated 502 within a first installer package. An executable application may be streamed 504 to a file in a temporary folder on the computing device 102. In addition, the installer may query 506 the system (e.g., the computing device 102) in order to identify a second installer package to modify. In one example, the second installer package may have been previously cached on a computing device 102. The second installer package may implement the uninstallation of a previously installed product or previously installed software on the computing device 102.

A custom database table may be queried 508 within the first installer package to identify the modifications to be applied to a second installer package. In one embodiment, a script file that includes modifications to apply to the second installer package may be created 510. The script file may be an SQL script file. The location of the executable application, the second installer package, and the script file may be stored. In one embodiment, the location of the application, the second installer package, and the script file may stored 512 in a CustomActionData property. In one example, the script file may be executed 514 by the executable application in order to modify an uninstaller module within the second installer package. In one embodiment, the executable application may be delivered by the first installer package. The present systems and methods may allow a cached package that is responsible to uninstall an old version of a product or software to be dynamically modified by an executable application. As previously described, the application may be an out of process application from the installer service 104.

Figure 6:
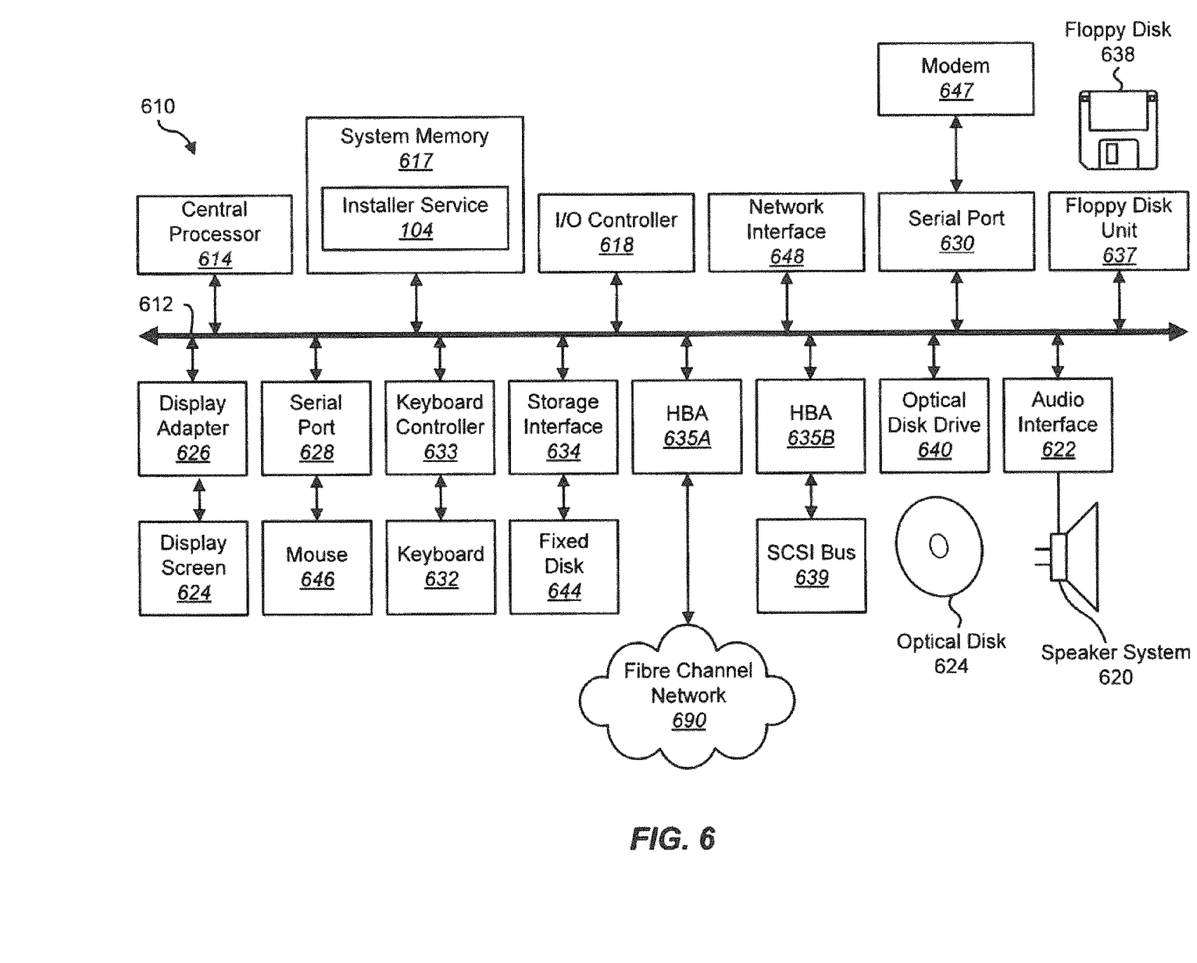
FIG. 6 depicts a block diagram of a computer system suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the installer service 104 to implement the present systems and methods may be stored within the system memory 617. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present disclosure. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
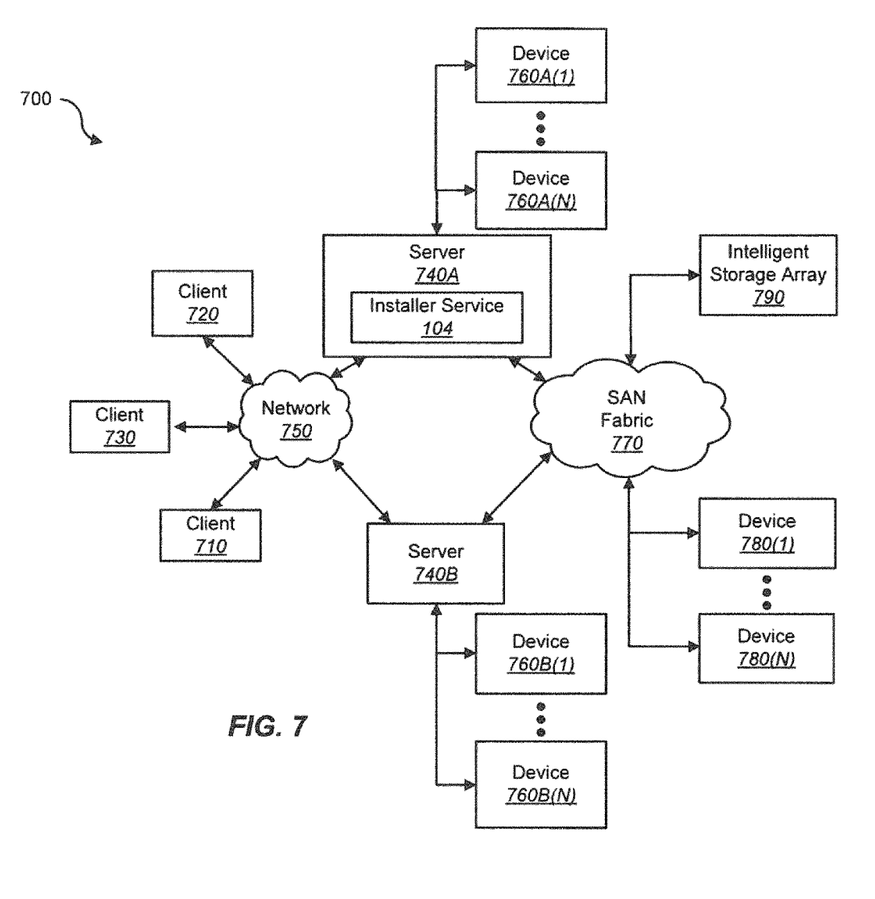
FIG. 7 is a block diagram depicting a network architecture in which client systems, as well as storage servers are coupled to a network.

FIG. 7 is a block diagram depicting a network architecture 700 in which client systems 710, 720 and 730, as well as storage servers 740A and 740B (any of which can be implemented using computer system 710), are coupled to a network 750. In one embodiment, the installer service 104 may be located within a server 740A, 740B to implement the present systems and methods. The storage server 740A is further depicted as having storage devices 760A(1)-(N) directly attached, and storage server 740B is depicted with storage devices 760B(1)-(N) directly attached. Storage servers 840A and 840B are also connected to a SAN fabric 770, although connection to a storage area network is not required for operation of the disclosure. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for remediating a defective uninstaller during an upgrade of a software product, comprising:
    initiating, by a first installer package, an installation process to install content of the first installer package in order to upgrade the software product on a system, wherein the installation process comprises removing a first version of the software product and replacing the first version of the software product with a second version of the software product;
    querying, before the first installer package completes the installation process, the system using a custom action within the first installer package to identify one or more defective uninstallers, the one or more defective uninstallers being from the first version of the software product, wherein identifying the one or more defective uninstallers comprises, at least in part, determining whether an uninstaller removes a resource used by the first and second versions of the software product;
    upon identifying the one or more defective uninstallers, streaming an executable application to a file in a temporary folder, wherein the executable application is separate from the one or more defective uninstallers;
    querying database tables in the first installer package to create a script file to modify the one or more defective uninstallers; and
    executing the script file with the executable application to modify the one or more defective uninstallers, the one or more defective uninstallers being executed to remove the first version of the software product from the system.

2. The method of claim 1, further comprising storing the location of the streamed executable application, the location of the one or more defective uninstallers, and the location of the script file.

3. The method of claim 1, wherein the one or more defective uninstallers are cached.

4. The method of claim 1, wherein the script file comprises a structured query language (SQL) script file.

5. The method of claim 1, wherein the database table comprises an identifier field, an SQL field, and a condition field.

6. The method of claim 5, wherein the SQL field comprises an SQL statement to execute on the one or more defective uninstallers.

7. The method of claim 6, wherein the condition field comprises a statement to indicate whether the SQL statement is to be executed on the one or more defective uninstallers.

8. The method of claim 1, further comprising executing a SetupPatchScript immediate custom action to stream the executable application to the file in the temporary folder.

9. A computer system configured to remediate a defective uninstaller during an upgrade of a software product, comprising:
    a processor;
    memory in electronic communication with the processor;
    the memory storing executable instructions, the instructions being executable by the processor to:
        initiate, by a first installer package, an installation process to install content of the first installer package in order to upgrade the software product on a system, wherein the installation process comprises removing a first version of the software product and replacing the first version of the software product with a second version of the software product;

query, before the first installer package completes the installation process, the system to identify the one or more defective uninstallers on the computer system, the one or more defective uninstallers being from the first version of the software product, wherein identifying the one or more defective uninstallers comprises, at least in part, determining whether an uninstaller removes a resource used by the first and second versions of the software product;

upon identifying the one or more defective uninstallers, stream an executable application to a file in a temporary folder, wherein the executable application is separate from the one or more defective uninstallers;

query database tables in the first installer package to create a script file to modify the one or more defective uninstallers; and execute the script file with the executable application to modify the one or more defective uninstallers, the one or more defective uninstallers being executed to remove the first version of the software product from the system.

10. The computer system of claim 9, wherein the instructions are further executable by the processor to store the location of the streamed executable application, the location of the one or more defective uninstallers, and the location of the script file.

11. The computer system of claim 9, wherein the one or more defective uninstallers are cached on the computer system.

12. The computer system of claim 9, wherein the script file comprises a structured query language (SQL) script file.

13. The computer system of claim 9, wherein the database table comprises an identifier field, an SQL field, and a condition field.

14. The computer system of claim 13, wherein the SQL field comprises an SQL statement to execute on the one or more defective uninstallers.

15. The computer system of claim 14, wherein the condition field comprises a statement to indicate whether the SQL statement is to be executed on the one or more defective uninstallers.

16. The computer system of claim 9, wherein the instructions are further executable by the processor to execute a SetupPatchScript immediate custom action to stream the executable application to the file in the temporary folder.

17. A computer-program product for remediating a defective uninstaller during an upgrade of a product, the computer-program product comprising a computer-readable medium having instructions thereon, the instructions being executable by a processor to:

initiate, by a first installer package, an installation process to install content of the first installer package in order to upgrade the software product on a system, wherein the installation process comprises removing a first version of the software product and replacing the first version of the software product with a second version of the software product;

query, before the first installer package completes the installation process, the system to identify one or more defective uninstallers, the one or more defective uninstallers being from the first version of the software product, wherein identifying the one or more defective uninstallers comprises, at least in part, determining whether an uninstaller removes a resource used by the first and second versions of the software product;

upon identifying the one or more defective uninstallers, stream an executable application to a file in a temporary folder, wherein the executable application is separate from the one or more defective uninstallers;

create a script file to modify the one or more defective uninstallers; and execute the script file with the executable application to modify the one or more defective uninstallers, the one or more defective uninstallers being executed to remove the first version of the software product from the system.

18. The computer-program product of claim 17, wherein the instructions are further executable by the processor to store the location of the streamed executable application, the location of the one or more defective uninstallers, and the location of the script file.

* * * * *